Sheet 1. 2 Sheets.
J. Hutchinson,
Grinding Mills.
№ 55,872.    Patented June 26, 1866.
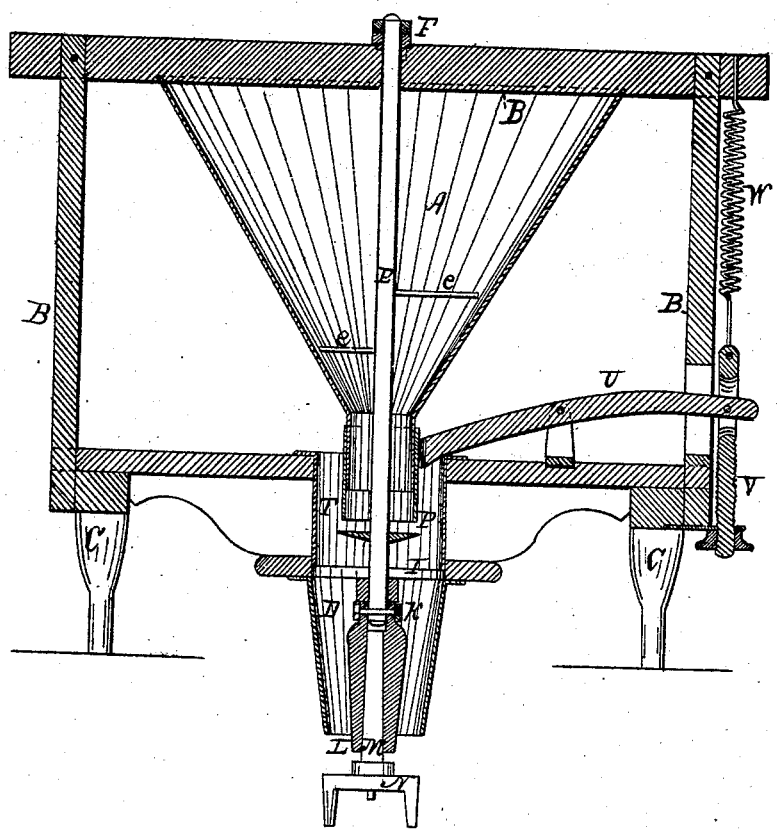
Witnesses:
Jos. J. Peyton
Theodore Lane
Inventor:
John Hutchinson
by his Atty
Baldwin &Co.

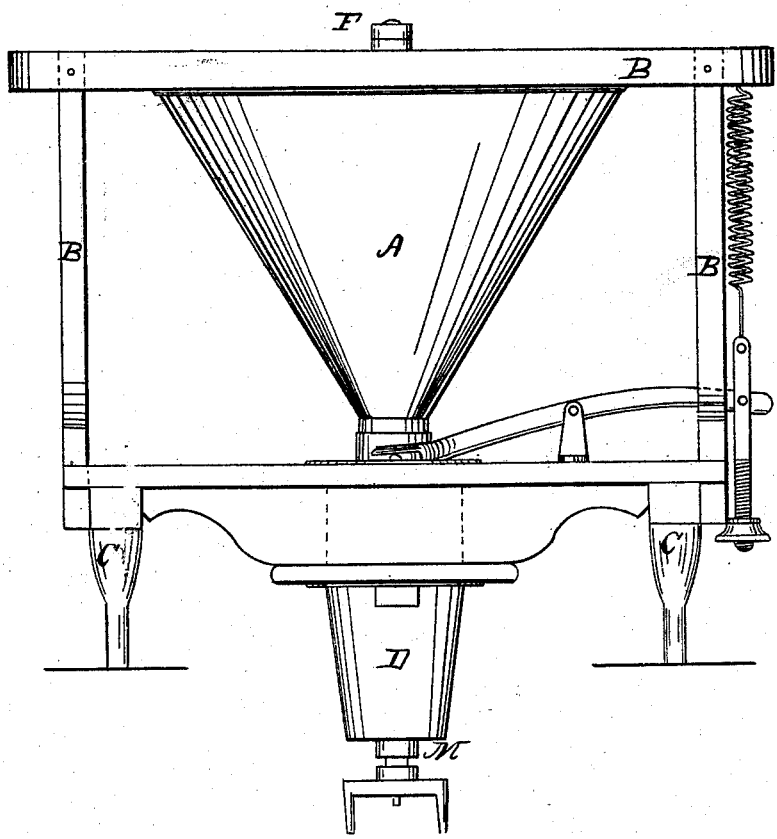

UNITED STATES PATENT OFFICE.

JOHN HUTCHISON, OF THREE RIVERS, MICHIGAN.

IMPROVEMENT IN GRINDING-MILLS.

Specification forming part of Letters Patent No. 55,872, dated June 26, 1866.

*To all whom it may concern:*

Be it known that I, JOHN HUTCHISON, of Three Rivers, in the county of St. Joseph and State of Michigan, have invented a new and useful Improved Feeding Apparatus for Grinding-Mills, of which the following is a full, clear, and exact description, reference being had to the accompanying drawings, which make part of this specification, and in which—

Figure 1 represents a view, in elevation, of my improved feeding device, and Fig. 2 a vertical central section through the same.

My invention relates to that class of grinding-mills in which what is called a "silent feed" is used—that is to say, the grain falls into and is fed from a rotating dish into the eye of the runner.

In mills of this class as heretofore constructed the runner revolves on a spindle projecting through the bed-stone and the feeding device is driven by a shaft rigidly connected to the runner; consequently, when the spindle expands by heat, or if the motion of the runner becomes irregular from any cause, the regularity of the feed is interrupted.

Now, it is the object of my invention to obviate this objection and to secure a silent regular feed from the hopper to the stones; to which end my improvement consists in combining the hopper, the stirrer, and the runner with the slide-coupling, as hereinafter more fully set forth.

In the accompanying drawings, which show my invention as applied to a middlings-feeder, a hopper, A, is shown as supported vertically over the stones in a suitable frame, B, resting upon legs C or other support. A conducting-tube, D, of a diameter greater than that of the mouth of the hopper, leads from the hopper nearly to the eye of the runner.

A shaft, E, supported at its upper end by a collar, F, resting on one of the cross-beams of the frame, and near its lower end turning in a bridge-tree, I, is arranged centrally within the hopper. The upper end of a collar, L, containing a square recess, is pivoted to the lower end of the shaft E by a bolt, K, which admits of a slight lateral play of the collar. A square-shanked spindle, M, fits into the recess of the collar L, its lower end terminating in a bifurcated bar, N, the forked ends of which are inserted into corresponding holes in the runner on the outside of the eye or in the bail, inside of the eye of the runner. The shaft E also carries arms or stirrers *e* within the hopper, of such form and in such numbers as may be desired. A scattering-dish, P, is also arranged on this shaft below the hopper.

In the accompanying drawings, my improvement is shown as applied to regrinding middlings; but obviously it is equally adaptable to grinding grain or other substances.

The operation is as follows: The rotation of the runner imparts a corresponding motion to the shaft E, stirrers *e*, and dish P. The grain or middlings passes down through the hopper to the dish P, and passes out at the opening between the dish and hopper, being thrown out by the centrifugal force generated by the rotation of the dish.

This device obviates the use of knockers, and constitutes the silent feed. The feed is regulated by a sliding sleeve, T, which moves up and down on the mouth of the hopper, and thus increases or diminishes the area of the opening between the dish and hopper. The sliding sleeve is adjusted and held in any desired position by a lever, U, controlled by a set-screw, V, and spring W.

The grain is thrown from the scattering-dish, and passes down the conductor D into the eye of the runner to be ground.

Should the runner rise or fall from any cause, the shank M will correspondingly slide in or out of the recess in the collar L, and thus accommodate itself to this movement without affecting the shaft E, by which means the distance between the dish P and the mouth of the hopper is unvarying, and the feed, when once adjusted, remains uniform. The bolt K also permits sufficient lateral vibration in the spindle N to accommodate any irregularity in that direction. This device I have found to be of great utility in practice.

The stirrers prevent clogging or packing of the middlings, and even serve to break up any lumps already formed.

What I claim as my invention, and desire to secure by Letters Patent, is—

The slip-coupling, in combination with the central shaft having stirrers and the hopper, arranged and operating as described.

In testimony whereof I have hereunto subscribed my name.

JOHN HUTCHISON.

Witnesses:
EDM. F. BROWN,
WM. D. BALDWIN.